(12) United States Patent
Liu et al.

(10) Patent No.: US 8,101,670 B2
(45) Date of Patent: Jan. 24, 2012

(54) POLYMERS WITH BENZOXAZINE GROUPS IN THEIR MAIN CHAINS

(75) Inventors: Ying-Ling Liu, Jhongli (TW); Ching-I Chou, Jhongli (TW)

(73) Assignee: Chung Yuan Christian University, Taoyuan County (TW)

( * ) Notice: Subject to any disclaimer, the term of this patent is extended or adjusted under 35 U.S.C. 154(b) by 366 days.

(21) Appl. No.: 12/427,196

(22) Filed: Apr. 21, 2009

(65) Prior Publication Data

US 2010/0216900 A1    Aug. 26, 2010

(30) Foreign Application Priority Data

Feb. 25, 2009  (TW) .............................. 98105903 A (51) Int. Cl.
*C08F 126/06* (2006.01)
(52) U.S. Cl. .......... 521/27; 526/258; 526/259; 526/260; 526/262
(58) Field of Classification Search .................... 521/27; 526/258, 259, 260, 262
See application file for complete search history.

(56) References Cited

U.S. PATENT DOCUMENTS 6,482,946 B1 * 11/2002  Dettloff et al. .................. 544/73

OTHER PUBLICATIONS

Ching-I Chou, Ying-Ling Liu "High Performance Thermosets from a Curable Diels-Alder Polymer Possessing Benzoxazine Groups in the Main Chain", Department of Chemical Engineering and R&D Center for Membrane Technology, Chung Yuan Christian University, Chungli, Taoyuan, Taiwan. Aug. 26, 2008.

* cited by examiner

*Primary Examiner* — Edward Cain
(74) *Attorney, Agent, or Firm* — WPAT, PC; Justin King (57) ABSTRACT

The present invention discloses polymers prepared through the Diels-Alder reaction with benzoxazine groups in their main chains. Moreover, polymers with high molecular weight could be successfully prepared via this method. Furthermore, the mentioned polymers are able to undergo crosslinking reaction by heat treatment. Heat energy causes the ring-opening reaction of benzoxazine in polymer main chains to undergo crosslinking reaction, and cross-linked polymers are thereby formed with great flexibility and high crosslinking degree.

14 Claims, 9 Drawing Sheets

POLYMERS WITH BENZOXAZINE GROUPS IN THEIR MAIN CHAINS

BACKGROUND OF THE INVENTION

1. Field of the Invention

The present invention is generally related to polymers with benzoxazine groups in their main chains, and more particularly to polymers prepared through the Diels-Alder reaction with benzoxazine groups in their main chains.

2. Description of the Prior Art

Similar to other thermosets, polybenzoxazines are conventionally obtained from the thermally curing reactions of small molecular, mono-or difunctional benzoxazine compounds. Most of the benzoxazine monomers are powder, which are hard to be processed into films.

Polymers possessing benzoxazine groups in the main chains could be obtained using difunctional amine and phenol derivatives as monomers. However, the number-average-molecular weights of the polybenzoxazines are not high (around 1000 to 4500 g/mol).

One example reported by Ishida and coworkers is benzoxazine-containing polyesters by using a benzoxazine-containing diol as amonomer. The molecular weights of the obtained polymers are as high as 30,000 g/mol. However, the thermal stability of the cured polybenzoxazines is not comparable with the conventional crosslinked benzoxazine resins. (Kiskan, B.; Yagci, Y.; Ishida, H. J Polym Sci Part A: Polym Chem 2008, 46, 414.)

In light of the above-mentioned problems, a new polybenzoxazine is still in great demand to fulfill the requirements of good thermal stability, and high mechanical strength. This remains an important research aspect in the industrial practical applications.

SUMMARY OF THE INVENTION

In view of the above background and to fulfill the requirements of the industry, new polymers with benzoxazine groups in their main chains are invented.

One subject of the present invention is to provide new polymers with benzoxazine groups in the main chains. The polymers are prepared through the Diels-Alder reaction using a first compound comprising at least two diene groups and a second compound comprising at least two dienophiles groups. First compound and/or second compound further comprise at least one benzoxazine group. The molecular weight of the better polymers is from 1000 to 300,000.

Another subject of the present invention is to provide crosslinked polymers. The polymers with benzoxazine groups in the main chain perform crosslinking reactions under heat treatment by means of the ring-opening reaction of the benzoxazine group to form crosslinked polymers. The Crosslinked polymers exhibit greater flexibility than another crosslinked polybenzoxazine.

Thus, the polymers prepared through the Diels-Alder reaction with benzoxazine groups in the main chains are potentially highly valuable in industrial applications.

BRIEF DESCRIPTION OF THE DRAWINGS

FIG. 3.(A) is the thermogram of differential scanning calorimetry (DSC) of PBz; and FIG. 3.(B) is the temperature-modulated DSC thermogram of PBz: (_) total heat flow, (--) nonreversible heat flow, and (. . . ) reversible heat flow.

DESCRIPTION OF THE PREFERRED EMBODIMENTS

What is probed into the invention is a polymer with benzoxazine groups in the main chain. Detailed descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater details in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

A first embodiment of the present invention, a polymer with benzoxazine groups in the main chain, wherein the polymer is prepared through the Diels-Alder reaction using a first compound comprising at least two diene groups and a second compound comprising at least two dienophiles groups, wherein first compound and/or second compound further comprise at least one benzoxazine group.

The molecular weight of the better polymer is from 1000 to 300,000. The diene group comprises one selected from the group consisting of the following: diene, furfuryl, cyclohexadiene and anthracene. Beside, the above mentioned dienophile group comprises one selected from the group consisting of the following: maleimide, maleic anhydride, acrylate, methacrylate, methylmethacrylate and alkyne.

An example of this embodiment is shown that the polymer is a thin film material or membrane material.

Another example of this embodiment is shown that the polymer is used in an application selected from the group consisting of: a gas separation membrane, proton exchange membrane for fuel cell, insulating film and encapsulation film.

A second embodiment of the present invention, a polymer with benzoxazine groups in the main chain, wherein the polymer is prepared through the Diels-Alder reaction using a first compound comprising at least two diene groups and a second compound comprising at least two dienophiles groups, wherein first compound and/or second compound further comprise a benzoxazine group.

The molecular weight of the polymer is from 1000 to 300,000. The diene group comprises one selected from the group consisting of the following: diene, furfuryl, cyclohexadiene and anthracene. Beside, the above mentioned dienophile group comprises one selected from the group consisting of the following: maleimide, maleic anhydride, acrylate, methacrylate, methylmethacrylate and alkyne.

An example of this embodiment is shown that the polymer perform crosslinking reactions under heat treatment. Heat energy causes the ring-opening reaction of benzoxazine in polymer main chains to undergo crosslinking reaction, and a crosslinked polymer is thereby formed.

Another example of this embodiment is shown that the crosslinked polymer is a thin film or membrane material.

Another example of this embodiment is shown that the crosslinked polymer is used in an application selected from the group consisting of: a gas separation membrane, proton exchange membrane for fuel cell, insulating film and encapsulation film.

A third embodiment of the present invention, the polymer with benzoxazine groups in the main chain, wherein the polymer is prepared through the Diels-Alder reaction using [bis (3-furfuryl-3,4-dyhydro-2H-1,3-benzoxazinyl)isopropane (BPA-FBz)] and bismaleimide (BMI).

An example of this embodiment is shown that the polymer is a thin film or membrane material.

Another example of this embodiment is shown that the polymer is used in an application selected from the group consisting of: a gas separation membrane, proton exchange membrane for fuel cell, insulating film and encapsulation film.

A fourth embodiment of the present invention, the polymer with benzoxazine groups in the main chain, wherein the polymer is prepared through the Diels-Alder reaction using [bis (3-furfuryl-3,4-dyhydro-2H-1,3-benzoxazinyl)isopropane (BPA-FBz)] and bismaleimide (BMI).

An example of this embodiment is shown that the polymer is able to undergo a crosslinking reaction by a heat treatment. Heat energy causes the ring-opening reaction of benzoxazine in polymer main chains to undergo crosslinking reaction, and a crosslinked polymer is thereby formed.

An example of this embodiment is shown that the crosslinked polymer is a thin film material or membrane material.

Another example of this embodiment is shown that the crosslinked polymer is used in an application selected from the group consisting of: a gas separation membrane, proton exchange membrane for fuel cell, insulating film and encapsulation film.

EXAMPLE

Preparation of Polybenzoxazine, PBz bis(3-furfuryl-3,4-dihydro-2H-1,3-benzoxazinyl)isopropane (BPA-FBz) (23.5 g, 50 mmol) and Bismaleimide (BMI) (17.9 g, 50 mmol) in 100 mL dried THF was charged into a 250-mL round-bottom flask with stirring. The reaction system was kept at 80° C. for 120 h. The reaction mixture was precipitated in excess acetone and purified by repeated dissolution-precipitation process for three times. The product was collected by filtration and dried under vacuum at 50° C. overnight to give the product of polybenzoxazine PBz.

Preparation of Crosslinked Polybenzoxazine Resin, PBz-R

PBz solution in NMP (5 wt %) was poured into a stainless mold. The residual was cured stepwise at 160° C. (3 h), 190° C. (2 h), and 230° C. (0.5 h) in an oven under a reduced pressure.

Cross-linked polybenzoxazine resin, PBz-R

Control Group

Preparation of Crosslinked Resin from Blend of BPA-FBz and BMI, PBz-BR

BPA-FBz (2.35 g, 5 mmol) and BMI (1.79 g, 5 mmol) were dissolved in NMP. The solution was poured into a stainless mold. The solvent was removed under vacuum. The residual was cured stepwise at 160° C. (3 h), 190° C.(2 h), and 230° C. (0.5 h) in an oven under a reduced pressure.

Characterization

Figure 1:
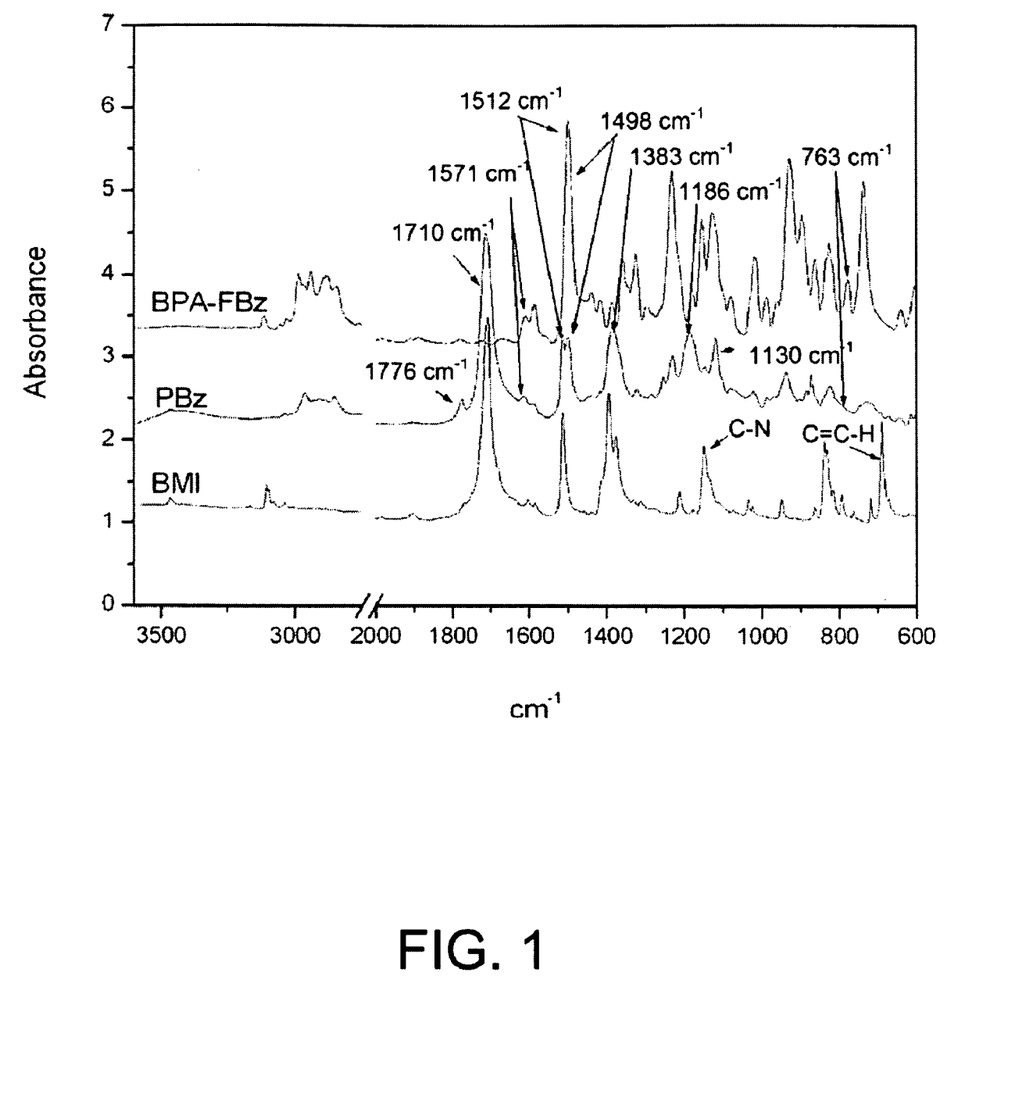
FIG. 1 is the FTIR spectra of polybenzoxazine PBz.

The chemical structure of PBz was characterized by FTIR and $^1$H NMR. As shown in FIG. 1, the adduct band of PBz appeared at 1776, 1710 cm$^{-1}$ (C=O) and 1383, 1186 cm$^{-1}$ (C—N), indicating the occurence of the DA reaction. The performance of DA reaction could also be demonstrated with strong decrease of the furanic peaks at about 1571 and 763 cm$^{-1}$ and the maleimide peak at 689 cm$^{-1}$. Other peaks characterizing the chemical structure of PBz are also found with the absorption at 1512 (disubstituted phenyl) and 1498 (trisubstituted phenyl).

Figure 2:
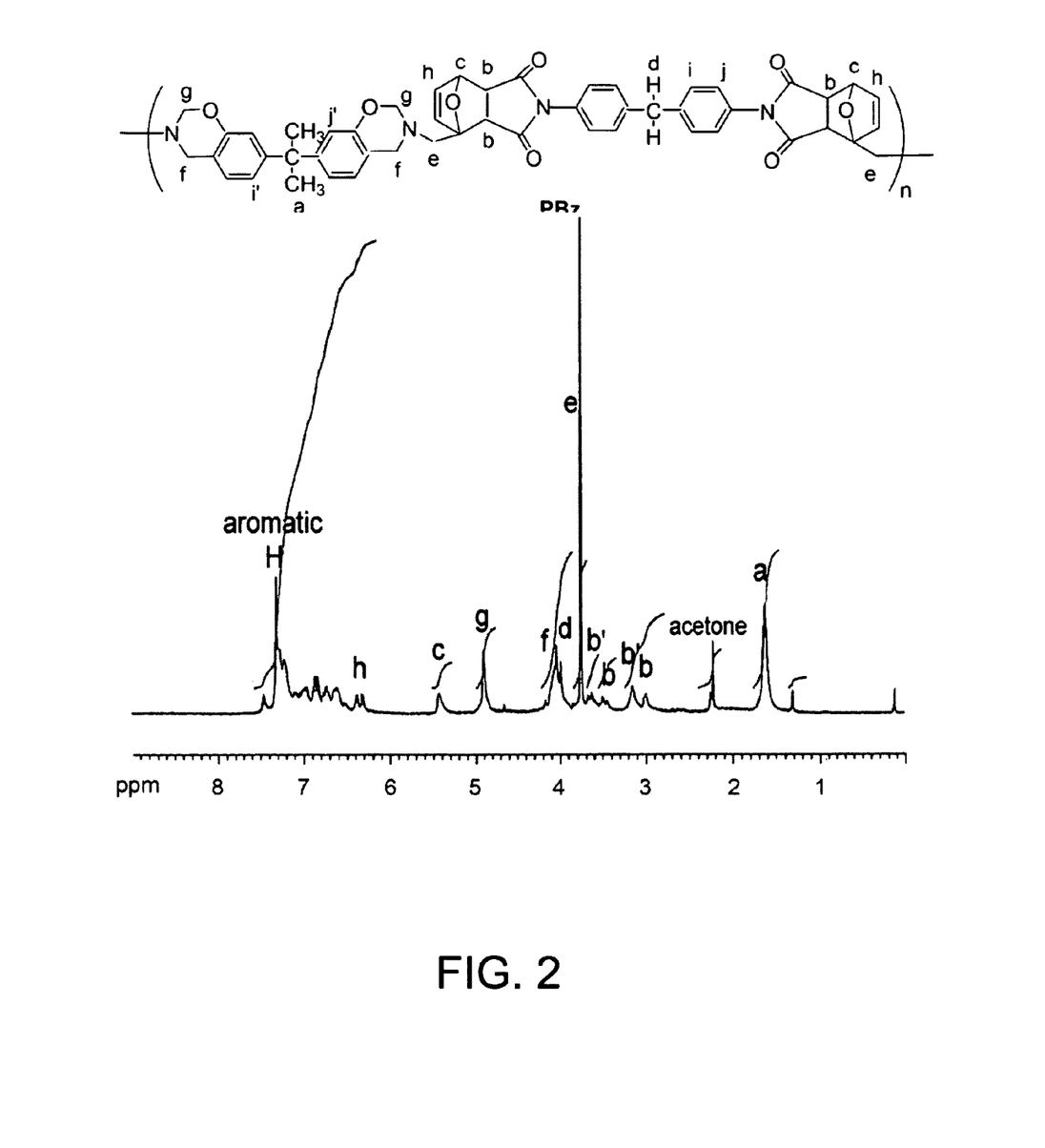
FIG. 2 is the $^1$H-NMR spectrum of polybenzoxazine PBz in d-chloroform.

FIG. 2 shows the $^1$H NMR spectrum of PBz using CDCl$_3$ as a solvent. The presence of the adduct groups from the DA reaction between maleimide and furan groups was demonstrated with the resonance peaks at δ=2.98, 3.22, 3.51, 3.73 ppm (—CH—),δ=5.41 ppm (—CH—O—), andδ=6.34 ppm (—CH=CH—). The benzoxazine ring was characterized with the resonance peaks atδ=4.05 ppm (-Ph-CH$_2$—N—) andδ=4.88 ppm (—O—CH$_2$—N—). The resonance peaks at δ=1.67 ppm (-Ph-C(CH$_3$)$_2$-Ph-) andδ=4.05 ppm (-Ph-CH$_2$-Ph-) correspond to the chemical structures of FBz and BMI monomers, respectively.

PBz has a numberaverage-molecular weight of about 19,000 g/mol and a polydispersity index of about 1.81 measured with a GPC using N,N-dimethylformamide (DMF) as an elution phase. The molecular weight of PBz is higher than those reported to most of other polybenzoxazines.

PBz is readily soluble in some low-boiling-point solvents such as chloroform and dichloromethane and aprotic high polar solvents such as NMP, DMF, dimethylacetamide (DMAc), and dimethylsulfoxide (DMSO). The organo-solubility of PBz demonstrates its ability of being processed under a solution phase. In addition, PBz is able to form free standing transparent films by solvent casting method.

Figure 3A:
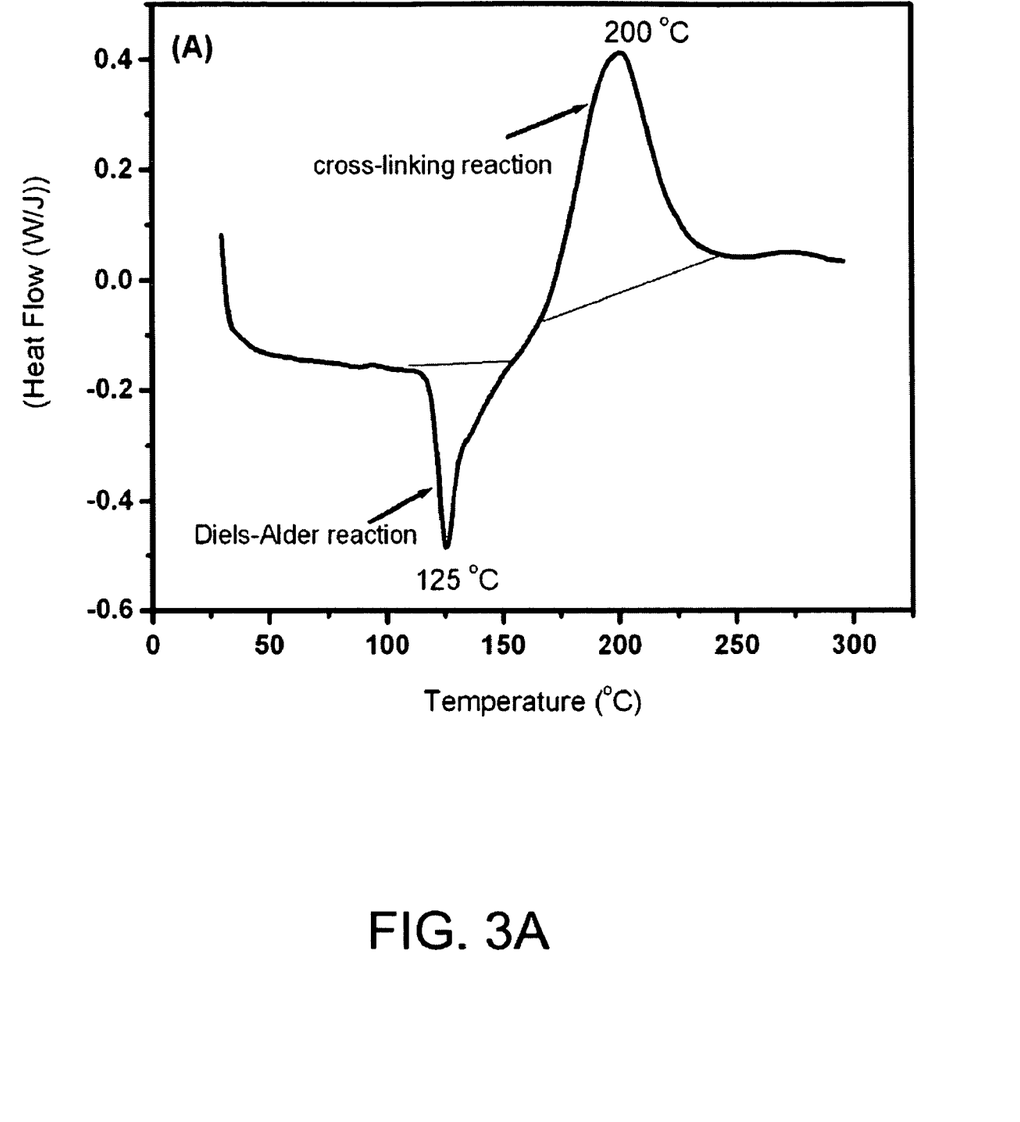
Figure 3B:
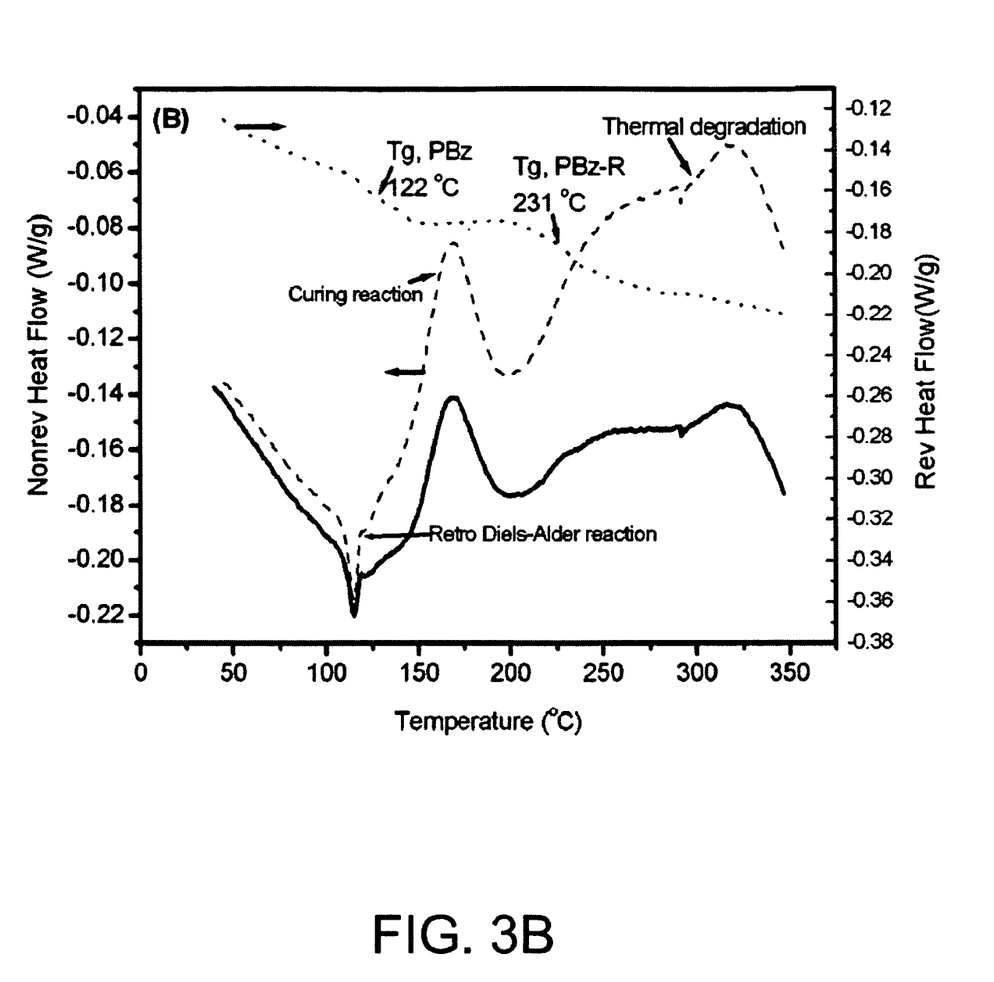

FIG. 3 shows the DSC thermograms of PBz. The endothermic peak at 125° C. is attributed to the retro Diels-Alder (retro-DA) reaction of the furan/maleimide adduct linkages in PBz. Breaks of the adduct linkages in the retro-DA reaction regenerate furan and maleimide groups. The exothermic behavior at about 200° C. could be due to the occurrence of ring-opening polymerization of benzoxazine groups, since the reaction temperatures are close the temperatures reported for other benzoxazines. However, only one broad exothermic peak appears in the DSC thermogram, indicating that the polymerizations of maleimide and benzoxazine might overlap in the temperature range, as the presence of benzoxazine groups might catalyze the maleimide polymerization and shift its reaction toward low-temperature region. The thermal behavior of PBz under heating was further examined with a temperaturemodulated DSC [FIG. 3(B)].

Figure 4:
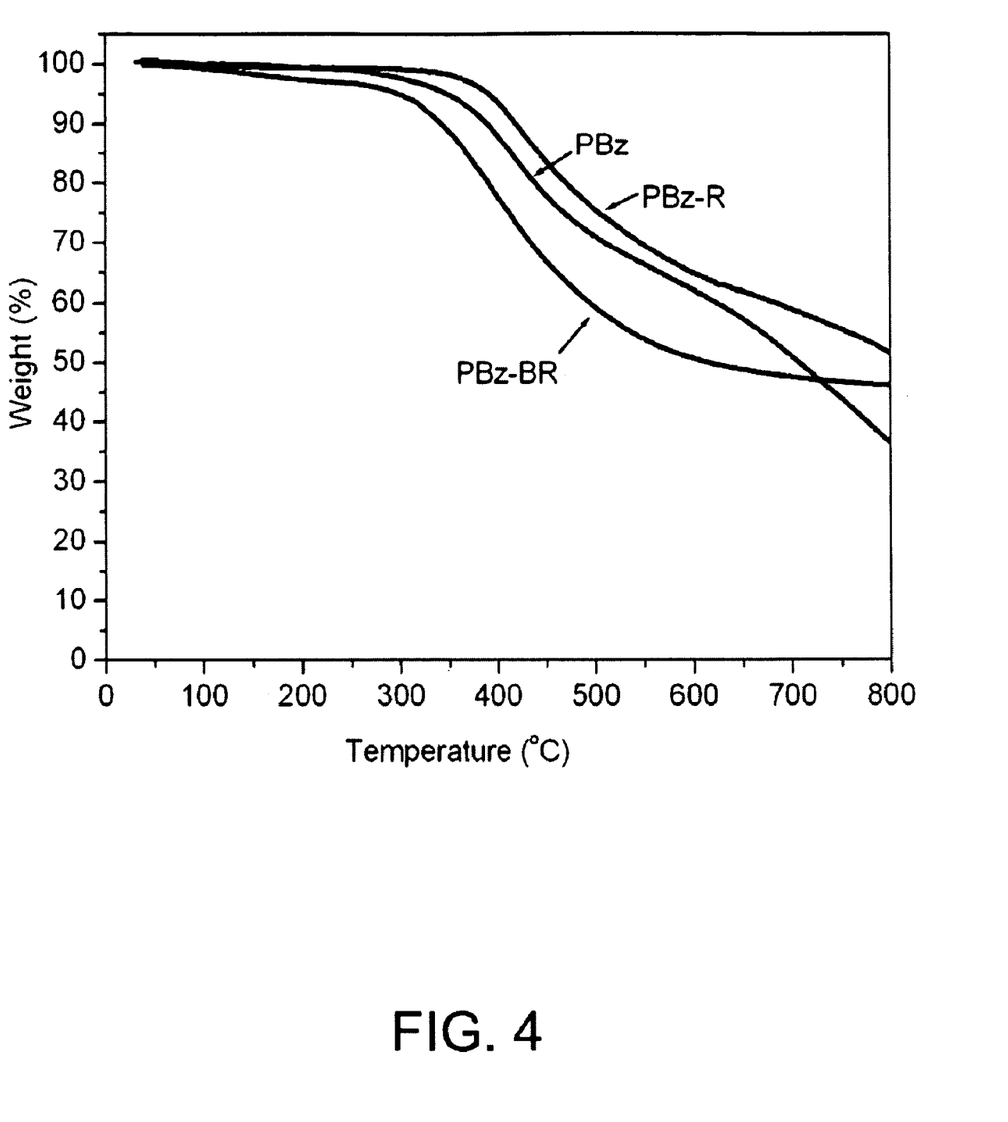
FIG. 4 is the TGA thermogram of polybenzoxazine PBz, crosslinked PBz (PBz-R), and cured resin from a mixture of BPA-FBz and BMI (PBz-BR). The analysis was performed with a hearing rate of 10° C./min under nitrogen.

FIG. 4 presents the TGA thermogram of PBz, PBz-R, and PBz-BR. PBz exhibits a high thermal stability with a temperature at 5 wt % weight loss (Tds) of 350° C. The char yield at 800° C. is 35 wt % for PBz.

Figure 5:
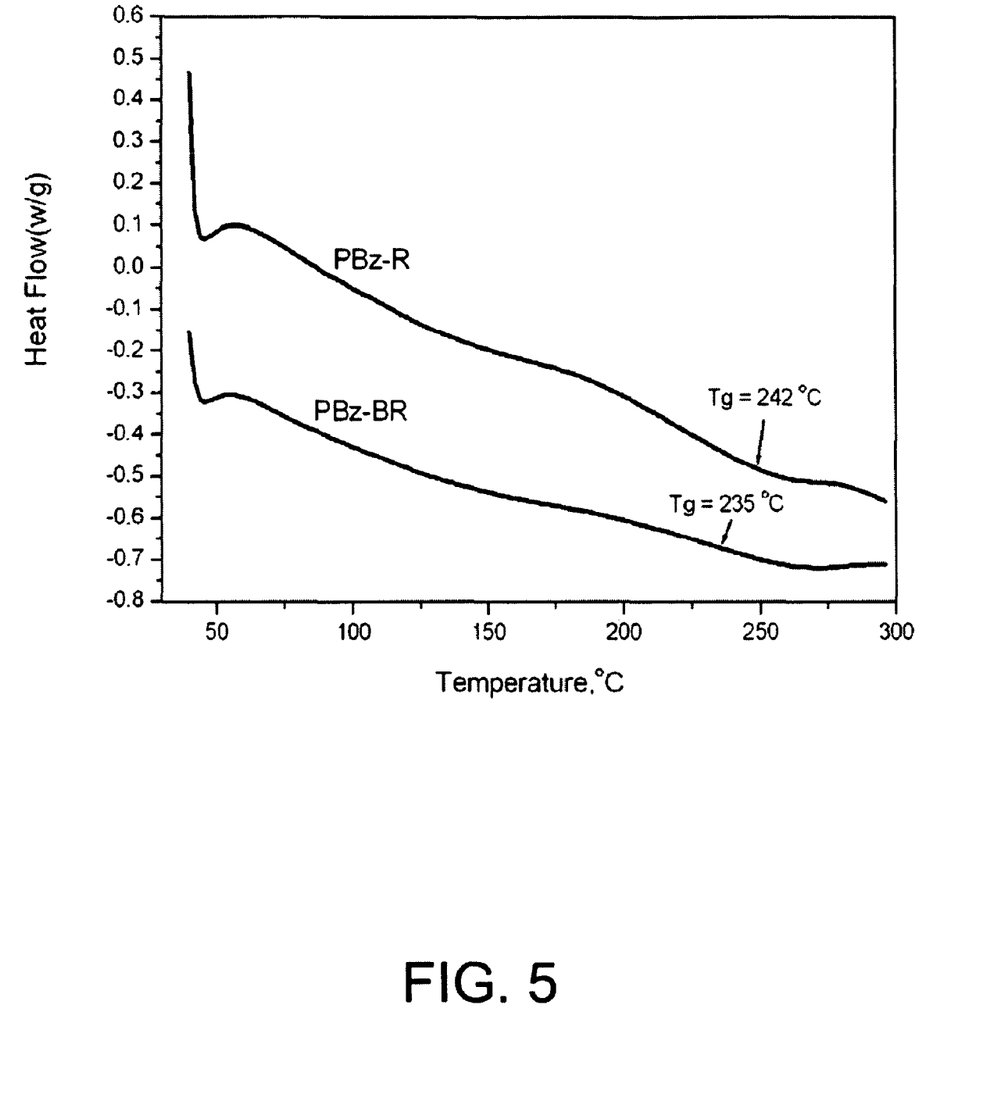
FIG. 5 is the DSC thermogram of PBz-R and PBz-BR.
Figure 6:
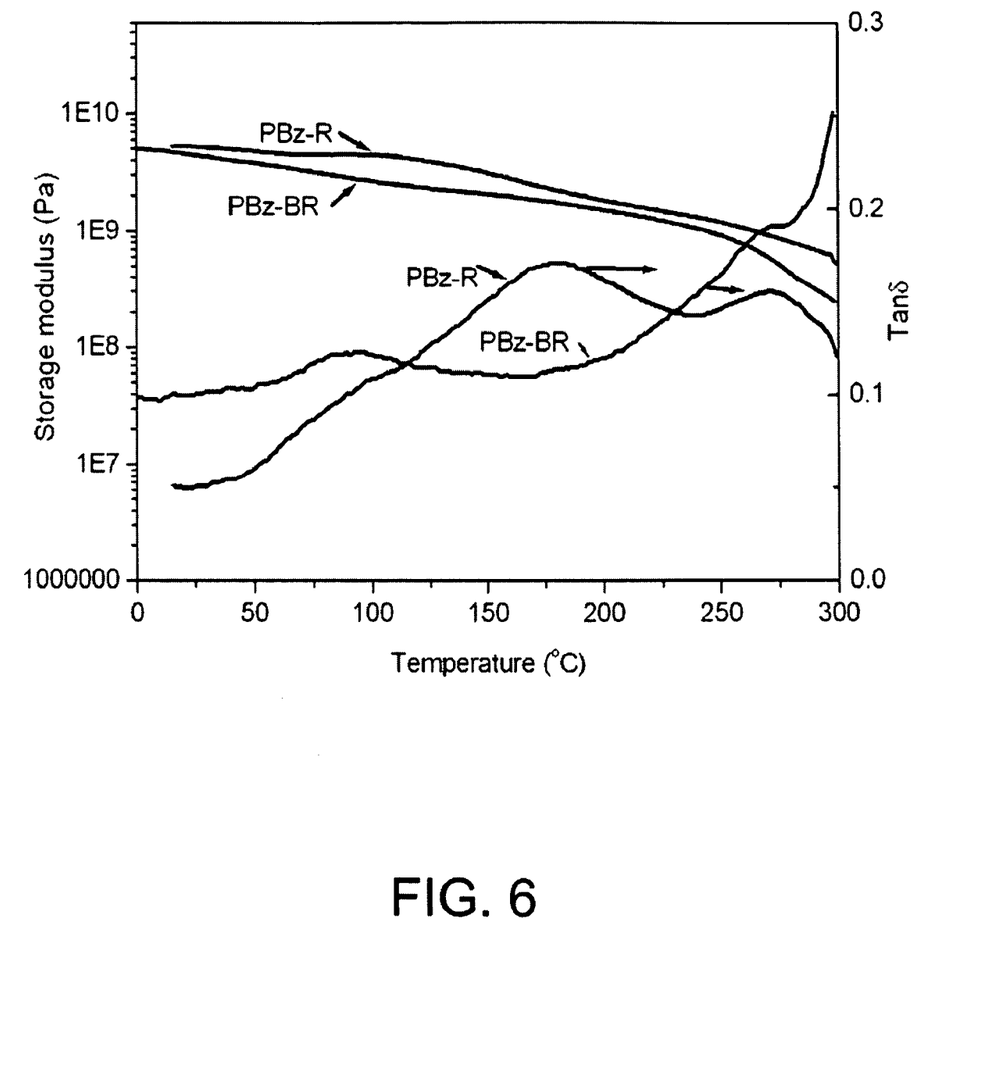
FIG. 6 is the DMA thermogram of PBz-R and PBz-BR.
Figure 7:
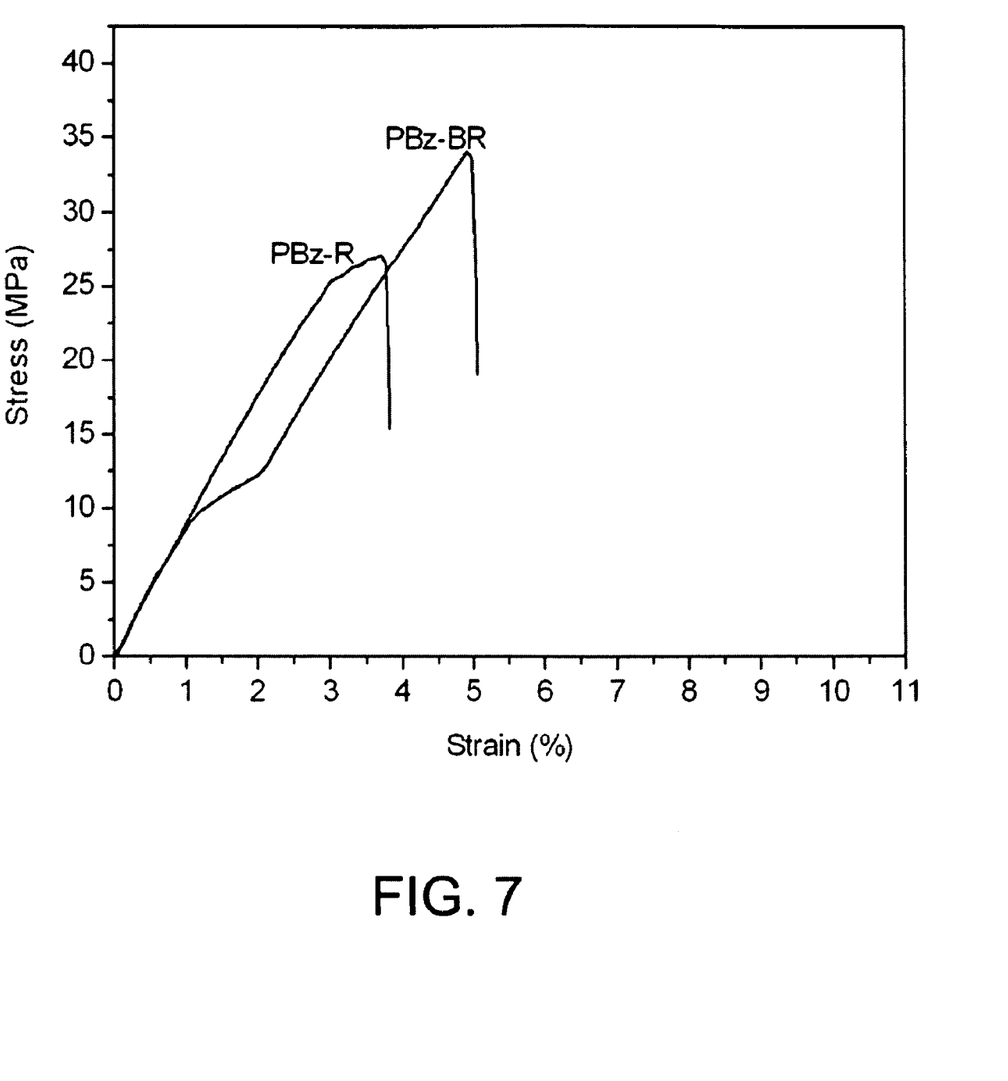
FIG. 7 shows stress-strain curves of PBz-R and PBz-BR recorded with an Instron.

The $T_g$s of PBz-R and PBz-BR reading from their DSC thermograms are 242 and 235° C., respectively, (FIG. 5). The $T_g$ of PBz-R is much higher than that of PBz (122° C.), indicating the performance of the curing reactions of benzoxazine and maleimide groups and demonstrating the formation of highly crosslinked structure. FIG. 6 shows the DMA thermograms of PBz-R and PBz-BR. The mechanical properties of the prepared polymers are measured with an Instron. The results are shown in FIG. 7. PBz-R exhibits high mechanical strength. The Young's modulus and tensile strength of PBz-R are 901 and 31 MPa, respectively. PBz-BR shows similar mechanical strength to PBz-R. However, PBz-R could be fabricated into a film but PBz-BR could not.

| Polymer | TGA Analysis | | Thermal and Mechanical Properties | | | | | |
|---|---|---|---|---|---|---|---|---|
| | $T_{d5}$ (° C.) | Char Yield at 800° C. (wt %) | Tg measured with DSC (° C.) | Storage Modulus (GPa) | Young's Modulus (MPa) | Tensile Strength (MPa) | Tensile Strain (%) | LOI (%) |
| PBz | 350 | 35 | 122 | 0.3 | 5.7 | 0.4 | 36 | 29 |
| PBz-R | 390 | 52 | 242 | 5.2 | 907 | 31 | 3.71 | 29 |
| PBz-BR | 286 | 48 | 235 | 4.4 | 901 | 34 | 4.97 | 29 |

Figure 8:
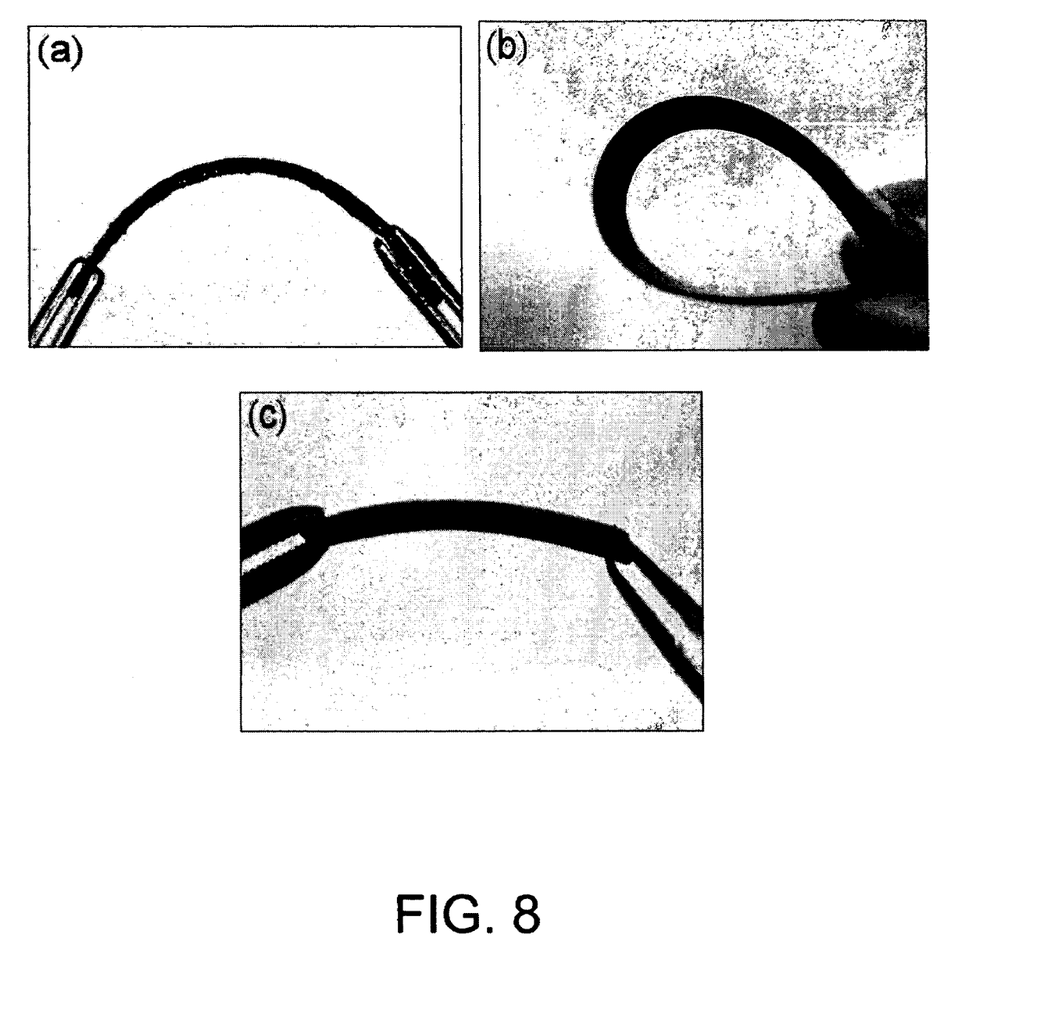
FIG. 8 are the photographs of (a) PBz, (b) PBz-R, and (c) PBz-BR showing their flexibility.

As shown in FIG. 8, PBz shows somewhat flexibility. The limited flexibility of PBz could be due to its rigid structure as PBz does not possess many flexible linkages. After thermally cured, the resulting polymer PBz-R surprisingly shows fully bending behavior without any problem. The flexibility of PBz-BR is poor, just like the behaviors observed with other highly crosslinked and rigid polymers.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A polymer with benzoxazine groups in the main chain, wherein said polymer is prepared through the Diels-Alder reaction using a first compound comprising at least two diene groups and a second compound comprising at least two dienophiles groups, wherein said first compound and/or said second compound further comprise at least one benzoxazine group.

2. The polymer according to claim 1, wherein the molecular weight of said polymer is from 1000 to 300,000.

3. The polymer according to claim 1, wherein said diene group comprises one selected from the group consisting of the following:
diene, furfuryl, cyclohexadiene and anthracene.

4. The polymer according to claim 1, wherein said dienophile group comprises one selected from the group consisting of the following: maleimide, maleic anhydride, acrylate, methacrylate, methylmethacrylate and alkyne.

5. The polymer according to claim 1, wherein said polymer is able to undergo a crosslinking reaction by a heat treatment;
wherein heat energy causes the ring-opening reaction of benzoxazine in polymer main chains to undergo crosslinking reaction, and a crosslinked polymer is thereby formed.

6. The polymer according to claim 5, wherein said crosslinked polymer exhibits greater flexibility than the other crosslinked polybenzoxazine which is not prepared through the Diels-Alder reaction.

7. The polymer according to claim 5, wherein said crosslinked polymer is a thin film or membrane material.

8. The polymer according to claim 1, wherein said polymer is a thin film or membrane material.

9. A polymer with benzoxazine groups in the main chain, wherein said polymer is prepared through the Diels-Alder reaction using [bis(3-furfuryl-3,4-dyhydro-2H-1,3-benzoxazinyl)isopropane(BPA-FBz)]and bismaleimide (BMI).

10. The polymer according to claim 9, wherein said polymer is able to undergo a crosslinking reaction by a heat treatment;
wherein heat energy causes the ring-opening reaction of benzoxazine in polymer main chains to undergo crosslinking reaction, and a crosslinked polymer is thereby formed.

11. The polymer according to claim 10, wherein said crosslinked polymer exhibits greater flexibility than the other crosslinked polybenzoxazine which is not prepared through the Diels-Alder reaction.

12. The polymer according to claim 10, wherein the glass transition temperature of said crosslinked polymer is equal to or more than 242° C.

13. The polymer according to claim 10, wherein said crosslinked polymer is a thin film or membrane material.

14. The polymer according to claim 9, wherein said polymer is a thin film or membrane material.

* * * * *